United States Patent [19]

Farmakis et al.

[11] Patent Number: 5,714,948
[45] Date of Patent: Feb. 3, 1998

[54] SATELLITE BASED AIRCRAFT TRAFFIC CONTROL SYSTEM

[75] Inventors: Tom S. Farmakis, Sharpsburg; Russell D. Routsong, Peachtree City, both of Ga.

[73] Assignee: Worldwide Notifications Systems, Inc., Atlanta, Ga.

[21] Appl. No.: 633,192

[22] Filed: Apr. 16, 1996

Related U.S. Application Data

[63] Continuation of Ser. No. 275,547, Jul. 15, 1994, abandoned, which is a continuation-in-part of Ser. No. 62,406, May 14, 1993, Pat. No. 5,351,194.

[51] Int. Cl.$^6$ ............................................. G08G 5/04
[52] U.S. Cl. ........................ 340/961; 342/29; 364/439
[58] Field of Search ............................. 340/961, 971, 340/945; 455/38.1, 115; 342/29, 30, 32, 36, 37, 38; 364/439, 461, 424.06

[56] References Cited

U.S. PATENT DOCUMENTS

| Re. 32,856 | 2/1989 | Millsap et al. |
|---|---|---|
| 2,698,391 | 12/1954 | Braden et al. |
| 2,748,759 | 6/1956 | Schiffer |
| 2,836,732 | 5/1958 | Newlin |
| 2,975,296 | 3/1961 | Dominguez-Rego |

(List continued on next page.)

FOREIGN PATENT DOCUMENTS 0123 562  10/1984  European Pat. Off. .......... G01S 5/02

OTHER PUBLICATIONS

"Device Lets Motorists Send 'Mayday' At Touch of Button," *The Atlanta Journal/The Atlanta Constitution*, Mar. 18, 1993.

1985 Derwent Publications Ltd., Abstract "Location and waiting time indicator esp. for buses—has bus-stop transponders linked to telephone network and buses which emit signals corresponding to location".

Avionics, *Business & Commercial Aviation*, May 1993, pp. 168–172.

Benenson, T., "GPS Test: Five Leading Aviation Hand--Helds Go Head-to-Head," *Flying*, Feb. 1994.

"Flight Tests Highlight New GPS Uses, Emphasize Need for GPS/Glonass System".

(List continued on next page.)

*Primary Examiner*—Brent A. Swarthout
*Attorney, Agent, or Firm*—Fish & Richardson P.C.

[57] ABSTRACT

A satellite based air traffic control (ATC) system includes an aircraft unit on an aircraft and an ATC facility. The aircraft unit includes an AARTS processor, GPS receivers or other satellite receivers, a comparator for comparing the GPS data, a two-way radio, and a transmitter and receiver for communicating information and data over a data link with the ATC facility. The ATC facility includes an ATC computer, a two-way radio, a display for displaying aircraft, and a transmitter and receiver for communicating information and data over the data link. The aircraft transmits aircraft identification information, GPS data, aircraft status information, and a transmit detect code to the ATC facility to allow the ATC to track the aircraft and identify the aircraft communicating on two-way radio. The traffic control system and a flight control system utilizing GPS may be used for aircraft in the air and on the ground, and may be used for ships, boats, automobiles, trains or railroads, and aircraft.

19 Claims, 3 Drawing Sheets

U.S. PATENT DOCUMENTS

| | | |
|---|---|---|
| 3,078,834 | 2/1963 | Wright . |
| 3,357,417 | 12/1967 | Baumann . |
| 3,455,403 | 7/1969 | Hawthorne . |
| 3,530,846 | 9/1970 | Bean et al. . |
| 3,538,898 | 11/1970 | Edgemir . |
| 3,633,040 | 1/1972 | Baxter . |
| 3,657,720 | 4/1972 | Avdenko et al. . |
| 3,696,333 | 10/1972 | Mott . |
| 3,718,899 | 2/1973 | Rollins . |
| 3,750,166 | 7/1973 | Dearth . |
| 3,808,598 | 4/1974 | Carter ................. 343/112 TC |
| 3,824,469 | 7/1974 | Pistonbatt . |
| 3,824,595 | 7/1974 | Hall . |
| 3,859,540 | 1/1975 | Weiner . |
| 3,870,994 | 3/1975 | McCormick et al. . |
| 3,886,515 | 5/1975 | Cottin et al. . |
| 4,039,957 | 8/1977 | Jennings . |
| 4,105,900 | 8/1978 | Martin et al. ............. 307/219 |
| 4,107,675 | 8/1978 | Sellers et al. . |
| 4,117,267 | 9/1978 | Haberle et al. ........... 179/15 BS |
| 4,176,318 | 11/1979 | Johnson et al. ............ 455/115 |
| 4,177,466 | 12/1979 | Reagan . |
| 4,197,538 | 4/1980 | Stocker . |
| 4,200,080 | 4/1980 | Cook et al. . |
| 4,236,594 | 12/1980 | Ramsperger . |
| 4,274,156 | 6/1981 | Trefney ................. 455/115 |
| 4,325,057 | 4/1982 | Bishop . |
| 4,345,554 | 8/1982 | Hildreth et al. . |
| 4,380,050 | 4/1983 | Tanner ................. 364/461 |
| 4,392,059 | 7/1983 | Nespor . |
| 4,454,510 | 6/1984 | Crow ................. 342/32 |
| 4,503,525 | 3/1985 | Malik et al. . |
| 4,606,307 | 8/1986 | Cook . |
| 4,622,557 | 11/1986 | Westerfield . |
| 4,630,289 | 12/1986 | Wren . |
| 4,642,775 | 2/1987 | Cline et al. . |
| 4,673,936 | 6/1987 | Kotoh . |
| 4,674,454 | 6/1987 | Phairr . |
| 4,688,026 | 8/1987 | Scribner et al. . |
| 4,688,244 | 8/1987 | Hannon et al. . |
| 4,704,735 | 11/1987 | Swapp et al. . |
| 4,718,080 | 1/1988 | Serrano et al. . |
| 4,736,461 | 4/1988 | Kawasaki et al. . |
| 4,750,197 | 6/1988 | Denekamp et al. . |
| 4,754,255 | 6/1988 | Sanders et al. . |
| 4,794,649 | 12/1988 | Fujiwara . |
| 4,797,677 | 1/1989 | MacDoran et al. ......... 342/352 |
| 4,809,316 | 2/1989 | Namekawa . |
| 4,814,711 | 3/1989 | Olsen et al. ............. 324/331 |
| 4,818,998 | 4/1989 | Apsell et al. . |
| 4,821,309 | 4/1989 | Namekawa . |
| 4,835,537 | 5/1989 | Manion . |
| 4,860,336 | 8/1989 | D'Avello et al. . |
| 4,882,696 | 11/1989 | Nimura et al. ............ 364/449 |
| 4,884,208 | 11/1989 | Marinelli et al. ........... 364/460 |
| 4,887,064 | 12/1989 | Drori et al. . |
| 4,888,595 | 12/1989 | Friedman . |
| 4,891,650 | 1/1990 | Sheffer . |
| 4,893,240 | 1/1990 | Karkouti . |
| 4,894,655 | 1/1990 | Joguet et al. ............ 340/988 |
| 4,896,154 | 1/1990 | Factor et al. ............. 364/449 |
| 4,897,642 | 1/1990 | DiLullo et al. . |
| 4,903,327 | 2/1990 | Raghuram et al. ......... 455/115 |
| 4,904,983 | 2/1990 | Mitchell . |
| 4,905,271 | 2/1990 | Namekawa . |
| 4,908,627 | 3/1990 | Santos . |
| 4,908,629 | 3/1990 | Apsell et al. . |
| 4,910,493 | 3/1990 | Chambers et al. . |
| 4,928,778 | 5/1990 | Tin . |
| 5,005,210 | 4/1991 | Ferrell ................. 455/115 |
| 5,014,206 | 5/1991 | Scribner et al. . |
| 5,021,794 | 6/1991 | Lawrence . |
| 5,025,247 | 6/1991 | Banks . |
| 5,025,382 | 6/1991 | Artz ................. 364/439 |
| 5,032,845 | 7/1991 | Velasco . |
| 5,043,736 | 8/1991 | Darnell et al. . |
| 5,043,903 | 8/1991 | Constant . |
| 5,055,851 | 10/1991 | Sheffer . |
| 5,081,667 | 1/1992 | Drori et al. . |
| 5,099,245 | 3/1992 | Sagey . |
| 5,103,459 | 4/1992 | Gilhousen et al. . |
| 5,109,341 | 4/1992 | Blackburn et al. . |
| 5,111,400 | 5/1992 | Yoder ................. 364/439 |
| 5,119,102 | 6/1992 | Barnard . |
| 5,153,836 | 10/1992 | Fraughton et al. . |
| 5,168,451 | 12/1992 | Bolger . |
| 5,197,009 | 3/1993 | Hoffman, Jr. et al. . |
| 5,208,590 | 5/1993 | Pitts . |
| 5,208,591 | 5/1993 | Ybarra et al. ............ 340/961 |
| 5,208,756 | 5/1993 | Song . |
| 5,210,534 | 5/1993 | Janex ................. 340/984 |
| 5,212,812 | 5/1993 | Dutton ................. 455/115 |
| 5,216,429 | 6/1993 | Nakagawa et al. . |
| 5,216,611 | 6/1993 | McElreath ............... 364/454 |
| 5,218,367 | 6/1993 | Sheffer et al. . |
| 5,218,629 | 6/1993 | Dumond, Jr. . |
| 5,221,925 | 6/1993 | Cross . |
| 5,223,844 | 6/1993 | Mansell et al. . |
| 5,243,529 | 9/1993 | Kashiwazaki . |
| 5,247,564 | 9/1993 | Zicker . |
| 5,301,368 | 4/1994 | Hirata . |
| 5,311,197 | 5/1994 | Sorden et al. . |
| 5,325,302 | 6/1994 | Izidon et al. ............ 364/461 |
| 5,334,974 | 8/1994 | Simms et al. . |
| 5,351,194 | 9/1994 | Ross et al. ............. 364/449 |
| 5,361,212 | 11/1994 | Class et al. ............. 364/428 |
| 5,364,093 | 11/1994 | Huston et al. ............ 273/32 R |
| 5,379,224 | 1/1995 | Brown et al. ............ 364/449 |
| 5,381,140 | 1/1995 | Kuroda et al. ........... 340/961 |
| 5,388,047 | 2/1995 | Ryan et al. ............. 364/461 |
| 5,554,990 | 9/1996 | McKinney .............. 342/36 |

OTHER PUBLICATIONS

Nordwall, B.D., *Aviation Week and Space Technology*, 135:22, p. 17, Dec. 2, 1991.

"GPS Demonstration Results Push System into Forefront for Airport Traffic Plan".

Chapman Security Systems, Inc. (Bensenville, Illinois), "Chapman 911Capital Litigation Support," Product Catalogue, undated, 4 pgs.

Connes, K., "GPS," *Plane & Pilot*, pp. 22–24, Aug. 1994.

Delta Air Lines "Cat II/III Operations—Technical Operations Training Course #401," Apr. 6, 1990.

Delta Air Lines Flight Operations Policy Manual, Jan. 29, 1993.

Gilbert, C., "Obtaining Real–time Differential Data from Government Sources," *Earth Observation Magazine*, Nov./Dec. 1993.

International Teletrac Systems, "Have an Unfair Advantage Over Car Thieves", Advertising Flyer, 1990, 3 pages.

International Teletrac Systems, "How to Put Your Fleet on the Map", Advertising Flyer, undated, 5 pages.

Klass, P.J., *Aviation Week and Space Technology*, 135:24/25, p. 42, Dec. 23, 1991.

Klass, Philip J., "Airline Officials Foresee Quick Growth in Use of GPS, Glonass on Commercial Transports", *Aviation Week and Space Technology*, Jun. 29, 1992, page 54.

Klass, Philip J., "FAA Steps Up Program to Introduce GPS as Instrument Approach Aid", *Aviation Week and Space Technology*, Aug. 17, 1992, pp. 35–36.

Klass, Philip J., "GPS Demonstration Results Push System Into Forefront for Airport Traffic Plan", *Aviation Week and Space Technology*, Dec. 16, 1991, page 42.

Logsdon, T., *The Navstar Global Positioning System*, Van Nostrand Reinhold, 1992.

Magnavox Advanced Products and Systems Company (Advertising Flyer), "Presenting the Most Advanced AVLS Available," 1988, 6 pages.

Meluso, D., "Accuracy Guaranteed." *Boating*, Sep., 1993.

Mets, Inc. (Indianapolis, Indiana), "Public Safety Police, Fire and Emergency Medical Services", 1989, 4 pages.

Mets, Inc. (Indianapolis, Indiana), "Trucking National & Regional Fleet Control", 1989, 4 pages.

Morgen–Walke Associates, Inc. News Release "Trimble Announces New Generation of GPS Marine Products," Jan. 5, 1994, London, U.K.

Nordwall, B.D., "Flight Tests Highlight New GPS Uses, Emphasize Need for GPS/Glonass System", *Aviation Week and Space Technology*, Dec. 2, 1991, p. 71.

Nordwall, B.D., "Imagination Only Limit to Military, Commercial Applications for GPS", *Aviation Week and Space Technology*, Oct. 14, 1991, p. 60.

Nordwall, B.D., "Low Price, New Ideas Fuel GPS Growth", *Aviation Week and Space Technology*, Nov. 30, 1992, p. 48.

Trimble Navigation (Sunnyvale, California), "Fleetvision Integrated Fleet Management System", undated, 9 pages.

Trimble Navigation (Sunnyvale, California), "Starfinder GPS Intelligent Mobile Sensor", 1991, 2 pages.

Trimble Navigation (Sunnyvale, California), "Starview Tracking and Display Station", undated, 1 page.

Trimble Navigation (Sunnyvale, California), "Trimble's GPS/AVL Continues to Dominate Public Safety Market," Press Release, Feb. 7, 1994.

Trimble Navigation, "FleetVision—Integrated Fleet Management System," (undated).

Trimble, "The 9th Utility" Advertisement.

U.S. DOT, FAA; 6560.14A Order, "Project Implementation Plan for the Digital Altimeter Setting Indicator (DASI) Program," Nov. 10, 1993.

U.S. DOT, FAA; 6690.4 Order, "Project Implementation Plan Voice Switching and Control System," Oct. 25, 1993.

U.S. DOT, FAA; 7110.10K CHG 2, re Flight Services, May 28, 1994.

U.S. DOT, FAA; 7110.65H CHG 1, re Air Traffice Control, Nov. 4, 1993.

U.S. DOT, FAA; 7110.65H CHG 2, re Air Traffic Control, Feb. 4, 1994.

U.S. DOT, FAA; 7210.3K CHG 1, re Facility Operation and Administration, Oct. 4, 1993.

Westinghouse (Baltimore, Maryland), "Vehicle Management Systems", Product Catalogue, undated, 4 pages.

5,714,948

SATELLITE BASED AIRCRAFT TRAFFIC CONTROL SYSTEM

CROSS REFERENCE TO RELATED APPLICATIONS

This application is a continuation of application Ser. No. 08/275,547, filed on Jul. 15, 1994, now abandoned which is a continuation-in-part of application Ser. No. 08/062,406 filed on May 14, 1993, now U.S. Pat. No. 5,351,194 issued on Sep. 27, 1994.

BACKGROUND OF THE INVENTION

The invention relates to a system for the tracking and control of aircraft and other vehicles and the communication between aircraft and traffic controllers, and specifically to a satellite based system for tracking, guiding, controlling and communicating with aircraft and vehicles in the air, in the water and on the ground.

Present air traffic control systems consist of a network of terminal area and enroute surveillance radar systems. These systems consist of both primary and secondary radar systems and computers that display usable data for the control of air traffic in the national and international airspace systems.

The basic radar system consists of Primary Radar which operates by transmitting a pulsed radio signal at a known azimuth (direction, in degrees from North) from the radar antenna and measures the time it takes to receive the reflected signal from an object (aircraft) in space back to the point of transmission. This time factor determines the range in nautical miles from the radar site and the direction is determined by the azimuth from which the signal is received. The limitations of using only this system result in the loss of targets because of the difficulty in detecting weak reflected radar return signals attenuated by atmospheric conditions.

Secondary radar, known as the Air Traffic Control Radar Beacon System (ATCRBS), utilizes cooperative equipment in the form of radio receiver/transmitter (Transponder). Radar pulses transmitted from the searching radar transmitter interrogate the airborne transponder. In response to receiving the interrogating signal from the radar, the Transponder transmits a distinctive signal back to the Radar Beacon System's antenna. For example Delta flight 195 to Dallas (Dal195) is requested to squawk "4142," resulting in the aircraft transponder being dialed to code "4142." The computer at the air traffic control (ATC) facility is preprogrammed to understand that transponder code "4142" corresponds to Dal195. The signal transmitted by the Transponder is typically coded to provide both aircraft altitude and aircraft identification data (4142) for processing by the air traffic controller's computer for display on the air traffic controller's radar scope. The aircraft's transponder is connected to an altitude encoder which encodes altitude data based on the altitude of the aircraft as determined from the aircraft altimeter. In addition, the aircraft's speed is presently determined by the ATC computer by measuring the time and distance differences from subsequent transmissions of the Transponder. The aircraft transponder code, altitude, and speed may be displayed on the controller's radar screen.

However, present radar-based air traffic control systems suffer from a number of disadvantages and drawbacks. Radar systems, even when used in conjunction with secondary radar, provide limited range and accuracy in the determination of the location and altitude of an aircraft. The range of radar is inherently limited due to obstacles in the line of sight of the radar, curvature of the earth, atmospheric conditions, etc. Search radar has a range of approximately 300 to 350 nautical miles, while terminal radar is utilized only for about 30 nautical miles. Radar coverage is not available in many areas of the world, and is not available at all altitudes in the United States.

Presently, radar is also used to track and determine the location of aircraft on the ground One current system is known as the Airport Surface Detection Equipment (ASDE), which is a high resolution radar system with a tower mounted radar antenna that "looks" down on the airport surface. This system tracks aircraft on the surface to a given altitude, for example from the surface to an altitude of 185 feet. This type of surface detection system has a number of disadvantages, including: a prohibitively high cost, aircraft targets are not tagged (location of aircraft is identified only by radio communications), the system produces split (ghost) targets, buildings and hangars restrict the view of some portions of the airport surface, high sensitivity of the system resulting in long periods of downtime for maintenance, and the system is not interfaced with departure controllers requiring the landing aircraft to be off the parallel runway before the departing aircraft can be released. Keeping track of the exact location of aircraft is important in low visibility conditions and enables controllers to expedite the flow of traffic.

In addition, the present communication process between aircraft and air traffic controllers is standardized, however, it is inherently subject to errors or miscommunications. Presently, air traffic controllers and aircraft exchange information and communicate orally (verbally) via two-way radio. Therefore, with the exception of information obtained via primary and secondary radar, all information from the aircraft regarding the aircraft's status (i.e., aircraft is okay, emergency condition, equipment malfunction), the aircraft's speed, heading, and identification of the aircraft, and instructions from the air traffic controller are communicated verbally via two-way radio. Thus, the exchange of accurate information between the air traffic controller and the aircraft is dependent upon hearing, understanding and recording a clear verbal communication via two-way radio. This reliance upon human hearing and interpretation during the communications process provides an inherent opportunity for errors or miscommunication and complicates the air traffic controller's job, particularly in light of the background and engine noise present on aircraft, poor radio performance or unclear speech.

Such miscommunication between flight crews and air traffic controllers can lead to serious problems. A controller may be giving instructions to the pilot of one aircraft on his radar screen and obtain an acknowledgement of the instructions from a pilot of another aircraft with a similar call sign or flight number. The only true verification that the correct aircraft received the instructions is a verbal verification of the correct call sign, or by observance by the controller that the aircraft called responded correctly to the instructions. If the wrong aircraft (or multiple aircraft) comply with the instructions and several aircraft are on the controller's screen, it may be difficult for the controller to recognize the error and safety can easily be compromised. Another common communication problem a controller may encounter is receiving an initial call from an aircraft and having difficulty identifying the corresponding aircraft on his radar screen. This is prevalent with the current system since all aircraft operating under Visual Flight Rules ("VFR") emit the same transponder code (1200). While standard codes emitted by a transponder are understood to communicate specific information, such as transponder code "7600" indicates radio failure, and code "7700" indicates an emergency, such transponder (radar) communication provides very limited communication of information (limited types of messages and only one message/communication at a time) and only operates in a radar environment.

Alternative ATC systems have been proposed that would use the global positioning satellites (GPS). Such a proposed alternative is discussed in chapter 12 of Logsdon, *The Navstar Global Positioning System*, Von Neistrand Reinhold (1992). In *The Navstar Global Positioning System*, Logsdon discusses the proposed use of GPS receivers on board aircraft, wherein the aircraft transmits its GPS aircraft vector to air traffic controllers for display on the air traffic controllers' screen. However, Logsdon's discussion fails to provide any details of such a system or how it could be implemented. Furthermore, Logsdon's proposal does not address ground or surface detection of aircraft. Also, the Logsdon proposal fails to address the need for improved communication of information between aircraft and air traffic controllers, and the need for a technique to identify the aircraft that is communicating with the air traffic controller.

Furthermore, present aircraft navigation and precision landing systems have a number of disadvantages. In the 48 contiguous United States, most instrument navigating is done with the aid of a VHF Omnidirectional Range (VOR) receiver for using the VHF radio signals emitted by the ground based VOR transmitters. Virtually all enroute navigation and many instrument approaches use these signals, which are broadcast in the frequency range 108.0 to 119.0 Mhz. The VOR signal is a blinking omnidirectional pulse, and has two parts: a reference phase signal and the variable phase signal. It its transmitted in such a way that the phase between these two signals is the same as the number of degrees the receiving aircraft is from the VOR station. The VOR receiver and equipment uses the signals to determine its magnetic direction, or course, from the VOR.

An additional navigation aide is known as Direction Measurement Equipment (DME). DME uses two-way (interrogation and reply) active spherical ranging to measure the slant range between the aircraft and the DME transmitting station. Many pilots and navigators vector airplanes from waypoint to waypoint using the signals from VOR/DME, rather than traveling in a straight line. As a result, aircraft are not traveling the shortest distance, causing increased fuel usage and increased travel time. Also, routes along the VOR/DME stations become heavily traveled resulting in increased probability of mid-air collisions.

In addition, many aircraft employ so-called Instrument Landing Systems (ILS) for performing precision landings. ILS includes several VHF localizer transmitters that emit focused VHF signals upwardly from the airport to provide horizontal guidance to the aircraft and its autopilot systems. ILS also includes a UHF glideslope transmitter that radiates a focused UHF signal that angles downwardly across the runway to provide vertical guidance. While ILS provides an effective technique for precision landings, such ILS precision landings are not possible where the airport does not include such localizer and glideslope transmitters.

The foregoing demonstrates a need for an improved air and ground traffic control systems for aircraft. There is also a need for improved communication and exchange of information between aircraft and air traffic controllers, and a need for a system that allows controllers to verify the communicating aircraft. There is also a need for an effective navigation system that does not rely on VOR/DME stations, and for an aircraft landing system that does not rely on localizer and glideslope transmitters.

SUMMARY OF THE INVENTION

The traffic control system of the invention meets these needs and overcomes the disadvantages and drawbacks of the prior art by providing an aircraft unit on board an aircraft and an air traffic control (ATC) facility that communicate via data link. The aircraft unit includes an ATC Aircraft Reporting and Tracking System (AARTS) processor for controlling operations of the aircraft unit, GPS receivers for determining the aircraft' position, trace altitude, and speed, a GPS data comparator for comparing the GPS data, a two-way radio, and a transmitter and receiver for transmitting and receiving (communicating) data and other information over a data link. Data that are communicated may include GPS data (altitude, position, heading and speed) and aircraft identification data (registration number, flight number, etc.), while other information communicated may include aircraft status information, requests, questions, responses, fight instructions, landing instructions, flight path information, information concerning conflicting aircraft, etc.

The ATC facility includes a transmitter and receiver for transmitting and receiving an information transmission (comprising data and other information) over the data link, a data decoder/detector for detecting data and communications in a received information transmission, a two way radio, an ATC computer for controlling operations at the ATC facility and identifying received data and communications, and a display for displaying the location and status of aircraft. Aircraft periodically transmit identification information, their GPS position, track, speed, and altitude, their status, and other information to the ATC facility. Based on this received information, the ATC facility continuously monitors and tracks aircraft. Because each aircraft transmits a different and predetermined identification, the ATC facility knows the identity of each target on the ATC controller's display. This system provides the additional advantage of allowing the ATC to accurately track aircraft without using radar, thereby avoiding the problems and disadvantages of radar, such as ghosts, limited range due to curvature of the earth and line-of-sight problems, etc. Furthermore, the tracking system of the invention may operate even in areas where no radar coverage is available. Also, the communication of requests, responses, information and data over a data link between aircraft and the ATC facility provides more accurate and complete communications than two-way radio, and avoids any miscommunications or misinterpretation of speech that commonly occur with two-way radio.

In addition, the aircraft unit also includes a transmit detector for detecting when the aircraft's two-way radio is transmitting. The ATC facility receives the transmit detect code along with the aircraft's identification via data link, thereby indicating when the aircraft's two-way radio is transmitting. This code may be displayed on the controller's display and allows the controller to identify or confirm exactly which aircraft on his screen/display he is communicating verbally over the two-way radio.

The system of the invention may be used to track aircraft in the air or on the ground. The ATC facility may include a pseudo-satellite, or a GPS receiver that acts as a base station to allow aircraft GPS receivers to operate in differential mode. In differential mode, the ATC facility determines the GPS pseudo-range correction by subtracting the geometric range (based on the facility's known location) from the pseudo-range (calculated using GPS signals). This correction may be used by the aircraft or the base station to obtain much more accurate aircraft positioning.

Each aircraft may include a flight control system for automating the flight and navigation of the aircraft. The flight control system includes a flight control computer for controlling the operation of the flight control system, GPS receivers, and a control panel. The flight control computer is connected to various aircraft interfacing systems, aircraft instrumentation, aircraft sensors, external navigation aids, and autopilot servos and servo drives. In an autopilot mode, the flight control computer automatically controls the aircraft to fly on a predetermined flight path. The flight control computer uses GPS data, and may use signals from external navigation aids and aircraft sensors to navigate the aircraft on the predetermined flight path. The aircraft may perform a precision (automatic) landing in the autoland mode using only GPS data, and preferably differential GPS data, rather than relying on the localizer and glideslope at the airport. The systems and methods of the invention may also be used on other vehicles, such as ships, boats, automobiles, and railroads.

DETAILED DESCRIPTION

Air Traffic Control System

Figure 1:
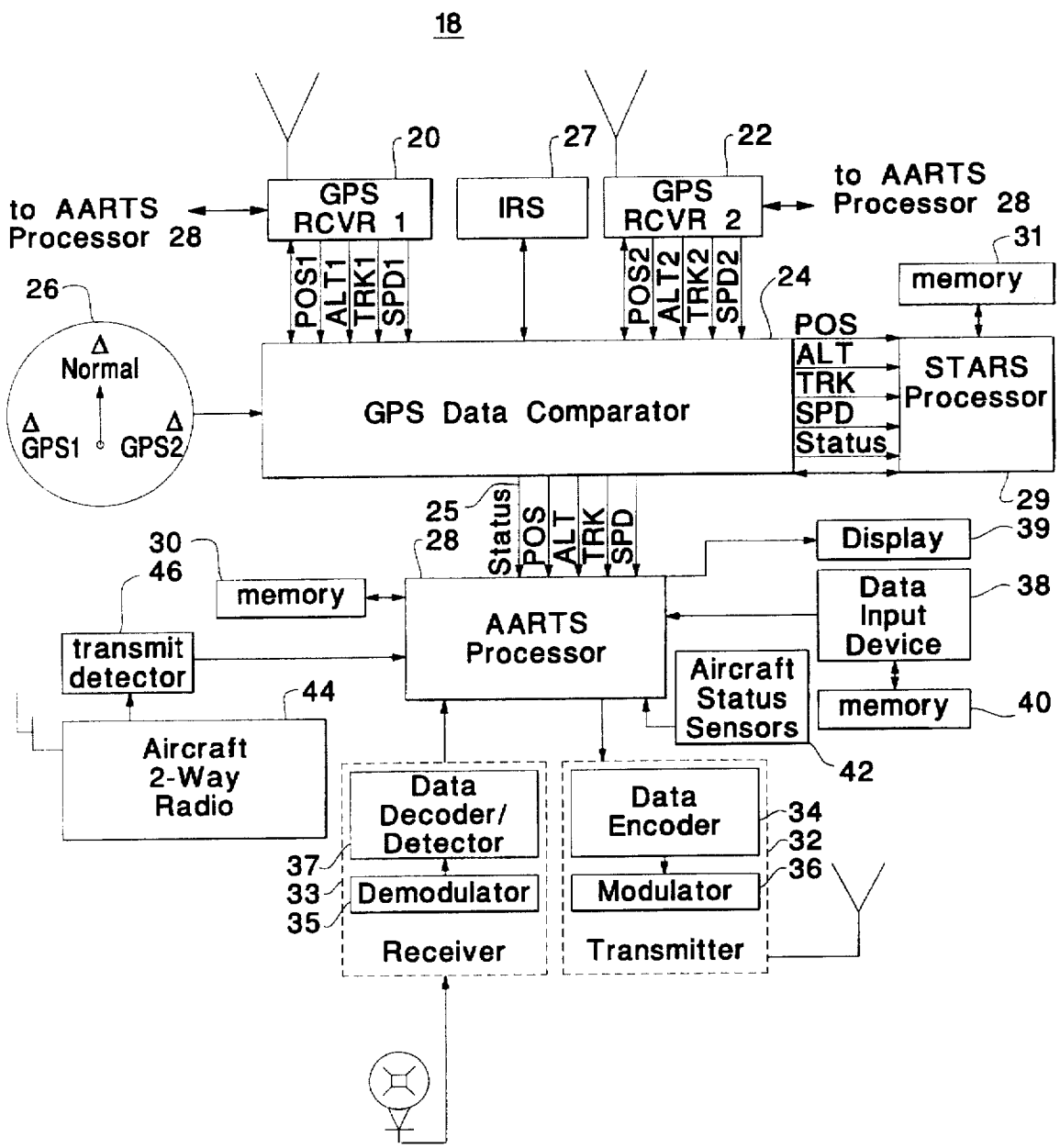
FIG. 1 is a block diagram of an aircraft unit constructed according to the principles of the invention.
Figure 2:
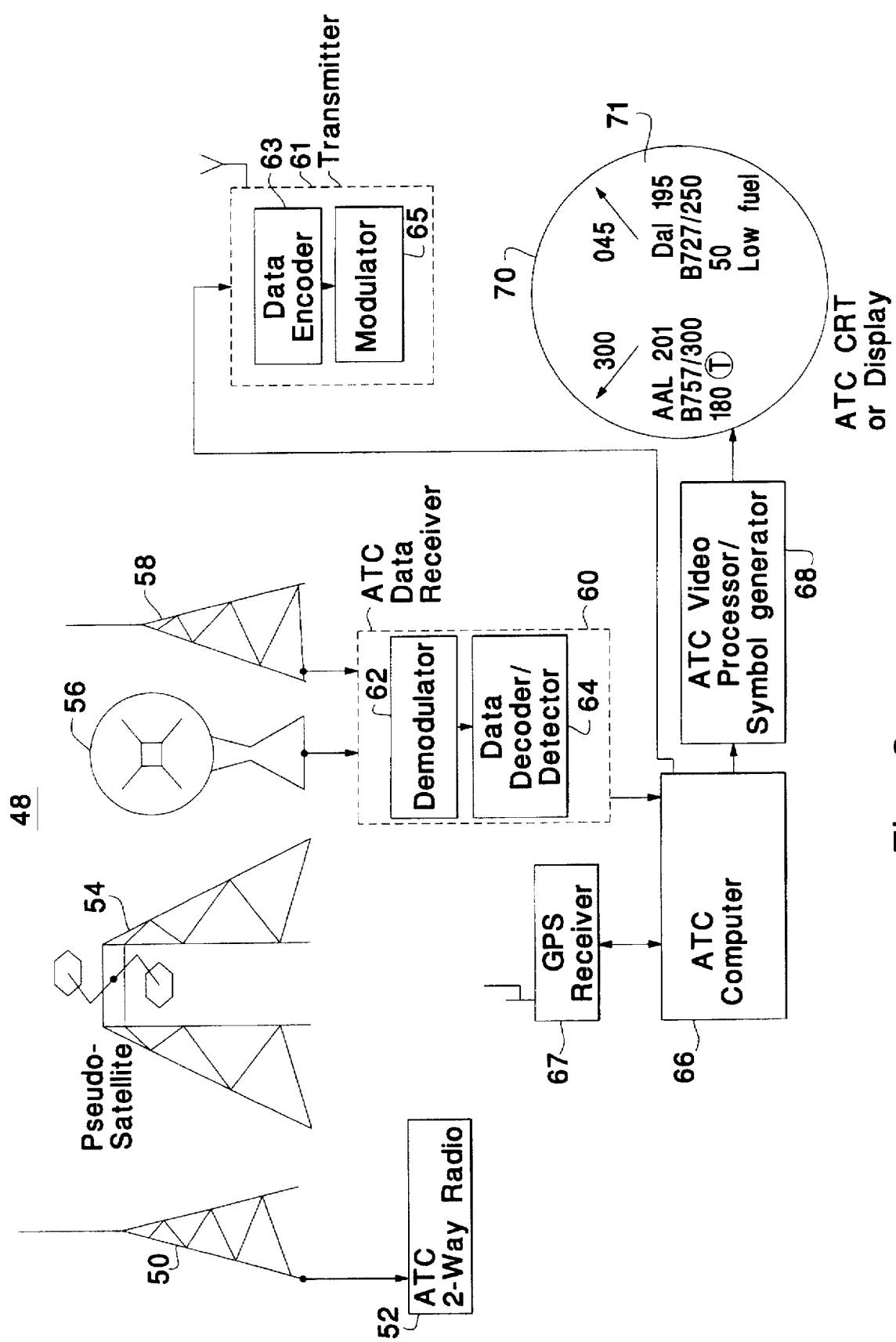
FIG. 2 is a block diagram of an air traffic control facility constructed according to the principles of the invention.

Referring to the drawings in detail, wherein like numerals indicate like elements, FIGS. 1-2 show the overall structure of a satellite based air traffic control (ATC) system according to the principles of the invention. FIG. 1 illustrates an aircraft unit 18 of the ATC system. FIG. 2 illustrates an ATC facility 48 of the satellite based ATC system according to the principles of the invention.

Referring to FIG. 1, aircraft unit 18, which is fixed to a conventional aircraft platform, includes dual global positioning system ("GPS") receivers 20 and 22 for determining the aircraft's position (longitude, latitude), speed, altitude, and tracking. Other types of satellite receivers, such as receivers for receiving signals from the Soviet Glonass satellites, may be used. As well understood by those skilled in the art, each GPS satellite transmits binary pulse trains, copies of which are created in the GPS receiver electronics. The GPS receiver antenna detects the signals (binary pulse trains) transmitted from GPS satellites, amplifies the received signals, and inputs them into two tracking loops that lock onto the carrier waves. The GPS pulse train is adjusted in the tracking loop until it is brought into correspondence with the satellite pulse train. When correspondence is achieved, the GPS receiver resident processor can determine time signal travel time based on the pulse adjustment. The GPS receiver resident processor then may determine the pseudo-range (distance from the GPS receiver to each satellite) based on the signal travel time (plus or minus clock bias error) multiplied times signal travel time; (pseudo-range=C×delta T). The GPS receiver may then determine its location using four pseudo-ranges, solving four simultaneous equations having four unknowns (clock bias error drops out), as well known to those skilled in the art. The GPS receiver resident microprocessor automatically determines the user's current position (longitude, latitude), altitude, tracking and speed (navigation solution).

Each GPS receiver should be a multi-channel receiver for receiving positioning signals from a plurality of GPS satellites. A number of GPS receivers are commercially available from such companies as Sony Corporation, Motorola, Rockwell International (the Naveore V GPS receiver), and others. One such commercially available GPS receiver is the Nay 1000 GPS receiver manufactured by Magellan Systems Corporation. The data output by GPS receivers 20 and 22 are output to GPS data comparator 24.

In a large commercial aircraft, GPS receivers 20 and 22 should be placed at opposite ends of the aircraft, for example, 100 feet apart. In large or small aircraft, the GPS receivers may alternatively be placed side-by-side. GPS data comparator 24 compares the data (location, altitude, speed, tracking) from both GPS receivers.

GPS receiver switch 26 is connected to comparator 24 and allows the selection of comparator 24 into one of three modes: 1) normal mode, 2) GPS1, and 3) GPS2. In the normal mode, comparator 24 compares the GPS data from the two GPS receivers 20, 22, to ensure that the data from these two receivers are reasonable compared to each other based on the distance separating the two receivers 20 and 22. In the normal mode, for example, GPS data comparator 24 may compare the data between the first and second GPS receivers 20 and 22 to determine whether the data from the first GPS receiver 20 is within a predetermined range of the data of the second GPS receiver 22. This GPS data from both GPS receivers is then output to the ATC Aircraft Reporting and Tracking System (AARTS) processor 28. The AARTS processor 28 controls the overall operation of the aircraft unit 18 of the ATC system and is discussed in greater detail hereinbelow. The GPS integrity line 25 from comparator 24 indicates whether the GPS data output by comparator 24 is correct or reasonable based on the comparison between the GPS data of the two GPS receivers 20, 22, or comparison between the GPS data and additional aircraft navigation equipment, such as the aircraft inertial reference system. In other words, GPS integrity line provides an indication as to the integrity of the operation of the GPS receivers 20 and 22 and whether such GPS may be relied upon. A logic output of "1" on line 25 may indicate that the data of GPS receivers 20 and 22 are within a predetermined range (i.e., 3%) of one another. A logic output of "0" on line 25 may indicate that the data from the two GPS receivers are not within the predetermined range, and therefore should not be relied upon. Alternatively, comparator 24 may average the data from the first GPS receiver with that of the second GPS receiver, and output this averaged data to AARTS processor 28, or AARTS processor 28 may average the data from the two GPS receivers. While comparator 24 may be a comparator circuit, comparator 24 may include a controller, a microprocessor, or a computer programmed to perform such comparison and output steps. Alternatively, the functions of comparator 24 may be performed by AARTS processor 28.

Referring to the second and third modes of switch 26, by switching switch 26 to "GPS1" or "GPS2", one of the two GPS receivers 20 and 22 may be selected. In these modes, uncompared GPS data from the designated GPS receiver is output from comparator 24 to AARTS processor 28. Alternatively, the selection of switch 26 to "GPS1" or "GPS2" may designate the selected receiver as a primary GPS receiver, and the remaining receiver is the secondary GPS receiver. In this mode of operation, the data from the primary GPS receiver is output by comparator 24, and GPS integrity line 25 indicates whether the data of the primary GPS receiver is within a predetermined range (i.e., 3%) of the data of the secondary GPS receiver.

Switch 26 may be operated manually, or automatically under control of AARTS processor 28. In addition, switch 26 may be manually or automatically switched to select an appropriate GPS receiver based on results from the built-in-test (or built-in self-test) of the GPS receivers, which may be monitored by the AARTS processor 28, or another processor. In the event of GPS failure or malfunction, the AARTS processor 28 selects and uses single uncompared GPS data from the operational GPS receiver, or may use other navigational aids, such as inertial reference system. In the event of power failure on the aircraft, power from the aircraft's emergency AC/DC electrical busses is used to power at least one of the GPS receivers 20, 22. It should be understood that the functions of switch 26 and comparator 24 may be performed in software by AARTS processor 28 or another processor. Instead of being separate GPS receivers, first and second GPS receivers 20 and 22 may comprise a single GPS receiver having, for example, six or more channels, allowing for the selection and/or comparison of multiple channels from the same GPS receiver.

It should be understood that more than two GPS receivers may be used. For example, it is advantageous to use three (or more) GPS receivers. In the event that one of the GPS receivers fails or malfunctions, comparator 24 and/or AARTS processor 28 would be able to detect the failed GPS receiver by comparison of data between the three receivers. For example, if data from two of the three receivers are within a predetermined range of one another (say, 3%), but the data from the third is not within this range, such a result indicates the likely failure or malfunction of the third GPS receiver. The AARTS receiver 28 or even comparator 24 would then be able to appropriately select GPS data only from the two correctly operating GPS receivers, and disregard the data from the third (malfunctioning) GPS receiver.

Aircraft unit 18 may also include or use a number of external navigation aids, such as altimeters, VOR receiver, DME receiver, Instrument Landing System (ILS) equipment (localizer and glideslope receivers). Inertial Reference System (IRS) 27, or the like. IRS 27 may include standard ring laser gyroscopes and accelerometers for determining the position of the aircraft. The IRS 27 is presently used by aircraft in conjunction with other navigation aids, such as VOR and DME, to determine the location of the aircraft. The IRS 27 may be used primarily for two purposes. First, aircraft location data from the IRS 27 may be input to comparator 24 or AARTS processor 28 to confirm the integrity of the GPS receivers. For example, the position, heading, etc., of the aircraft as determined by the IRS 27 may be compared to data from one or all GPS receivers to confirm that the GPS receivers are operating within a prescribed range or tolerance. Second, IRS 27 may be used by the aircraft as an auxiliary positioning system. In the event that it is determined that the GPS receivers have malfunctioned or failed, AARTS processor 28 may then select IRS 27 as the primary positioning system of the aircraft, rather than the GPS receivers.

AARTS processor 28 receives data (status, position, speed, tracking, altitude) from comparator 24. AARTS processor 28 controls the function and operation of aircraft unit 18. In a preferred embodiment, GPS receivers 20 and 22 and AARTS processor 28 are contained within a single box, with the GPS receivers 20 and 22 receiving and demodulating the received GPS positioning signals, and the AARTS processor calculating location, track, altitude and speed based on the received positioning signals, and with the AARTS processor 28 also controlling or managing the operation of the many additional functions of aircraft unit 18. In this manner, smaller size, lighter weight, decreased power consumption and cost savings result from combining the processor resident in the GPS receiver (not shown) and the AARTS processor 28 into a single processor (AARTS processor 28). Also, AARTS processor 28 preferably performs the functions of comparator 24 and switch 26.

AARTS processor 28 is connected to a computer memory 30, which stores data and information. A data input device 38 may be used to input data, information, commands, communications into AARTS processor 28 for storage, processing or communication. Data input device 38 may include a code generator for generating specific codes that are input to AARTS processor 28 and which may be communicated via data link to the ATC facility 48. Alternatively, AARTS processor 28 receives information from input device 38 and generates codes to be communicated to the ATC facility 48. Data input device 38 is used by a pilot prior to or during each flight to enter information or special codes (i.e., emergency code, hi-jacker on-board code) identifying the aircraft into AARTS processor 28. For example, the identification code will be the aircraft's identification, tail or "N" number, airline flight number, or other code or number for identifying the aircraft. The type of aircraft will be indicated by the appropriate aircraft designator, such as B727 (Boeing 727), or C310 (Cessna 310). In addition, a special flight plan code for the type of flight plan and/or operation (VFR or IFR) and the type of aircraft is input. An "I" or a "V" is input to identify that the aircraft is operating under Instrument Flight Rules or Visual Flight Rules, respectively. The aircraft designator or identification code or other permanent information may be permanently stored in memory 40 to simplify or minimize the information that is input at the beginning of each flight into AARTS processor 28 using the data input device 38. In such case, a copy of the stored information is automatically copied from memory 40 into AARTS processor 28 (or RAM) at the beginning of each flight. In addition, speech recognition equipment may be connected to AARTS processor 28 to convert the pilot's verbal instructions into coded data that is input into AARTS processor 28, rather than having the pilot enter or type in the data using data input device 38. Display 39 is connected to AARTS processor 28 to provide visual information to the pilot and to allow the pilot to confirm the data or information that has been input using data input device 38.

Aircraft status sensors 42 are connected to AARTS processor 28 and may comprise switches, sensors or other devices for detecting a number of different aircraft status. For example, sensors 42 may comprise an emergency switch for detecting the presence or occurrence of an emergency condition or request for assistance, a sensor for detecting low fuel, a sensor or switch for detecting the lowering of the aircraft landing gear, a sensor for detecting a fault or failure in the navigation sensors, radio, equipment or electronics, etc., or a sensor or switch for detecting a request to close the aircraft's flight plan. Sensors 42 may include a sensor or switch for detecting when an aircraft has crashed or has been unintentionally downed. Sensors 42 may include a sensor or switch for detecting the lowering of the aircraft's landing gear. Sensors 42 may comprise sensors or switches that may be actuated automatically or manually. AARTS processor 28 may monitor sensors 42 using a number of different well known techniques. For example, AARTS processor 28 may monitor sensors 42 through the detection of interrupts generated by the sensors 42 to processor 28, or by periodically polling the sensors 42.

AARTS processor 28 may record the actuation of the detected sensor or switch in memory 30. As discussed in greater detail hereinbelow, AARTS processor 28 communicates via data link the aircraft GPS data (position, speed, altitude, track), information of the various aircraft status sensors 42 identifying the different status of the aircraft, and information identifying the aircraft (aircraft identification data), flight number, flight plan code, etc., and other information to the ATC facility 48. AARTS processor 28 may also receive information from the ATC facility 48 via data link prior to take-off, or during flight. Prior to take-off, the ATC facility 48 may transmit the aircraft's flight plan (which was provided to the ATC facility 48) and other information to the AARTS processor 28, where it is stored in memory 30. ATC facility 48 may also communicate with processor 28 via data link to communicate data, information, or verify the flight plan or other information with the aircraft.

A standard VHF two-way radio 44 is used by the pilot or co-pilot to communicate with ATC facility 48. As understood by those skilled in the art, other types of radios may be used. A transmit detector 46 detects when radio 44 is transmitting. The detection of transmission from radio 44 may be performed in a number of different ways. For example, transmit detector 46 may be connected to the microphone of the radio and detects whenever the microphone is keyed or actuated. Voice detection circuitry may be connected to an intercom box, or electronic circuitry may be connected directly to transmission circuitry of radio 44 to detect when radio 44 is transmitting. In response to detecting the transmission of information by radio 44, transmit detector 46 notifies AARTS processor 28 of the transmission from radio 44. Detector 46 may notify AARTS processor 28 of the detected transmission in a number of different ways. For example, detector 46 may generate an interrupt that is detected by AARTS processor 28, or detector 46 may change the logic value on its output line from a "0" to a "1" to indicate a transmission from radio 44. This output line may be monitored by AARTS processor 28, or the detector 46 may be frequently polled by AARTS processor 28 to determine when the radio is transmitting. As discussed below, the AARTS processor 28 communicates via data link to inform the ATC facility 48 of a detection of a transmission from radio 44 during the period that radio 44 is transmitting. In response to detecting a transmission from radio 44, either a code generator or AARTS processor 28 generates a predetermined code or symbol to be transmitted to the ATC facility 48 via data link during the period which radio 44 is transmitting. Preferably, this communication from AARTS processor 28 informs the ATC facility 48 of the transmission from radio 44 and causes equipment (i.e., a display) at the ATC facility 48 to generate the predetermined symbol.

Although a number of different symbols, codes, or other indications of transmission may be used, a T or (T) is preferably used to indicate that radio 44 is transmitting. The transmission of a radio transmit detect code or symbol from the aircraft to the ATC facility 48 during the transmission of radio 44 allows the air traffic controller at the ATC facility 48 to identify (and confirm) the aircraft associated with the voice he is hearing over his/her radio. The use of the radio transmit detect code and the transmission of an aircraft identification code or symbol identifies or tags each aircraft to allow the ATC facility 48 to keep track of each aircraft.

If the aircraft is equipped with a Satellite Tracking Alert Resolution System (STARS) (see STARS processor 29) or another an anti-collision system that provides anti-collision evasive commands, a signal will be output from the STARS processor 29 or other evasive command control unit to immediately notify AARTS processor 28 of the aircraft unit 18 of the directed evasive command. An evasive command code generator may generate an evasive command code to notify AARTS processor 28, or the AARTS processor may be interrupted or otherwise informed of the evasive command. The aircraft may then automatically control its flight or course to implement the evasive command. The AARTS processor 28 communicates via data link to the air traffic controller to transmit the evasive command code to the ATC facility 48, or otherwise inform the air traffic controller of the evasive command that has been issued to the pilot, and whether the evasive command is being followed. The evasive command code may be received at ATC facility 48 and visually observed as a flashing annunciator, light or other indicator to inform the air traffic controller of the aircraft's intent to climb, descend, turn right, turn left, etc.

Aircraft unit 18 also includes a transmitter 32 and a receiver 33 for transmitting and receiving information and data over data link. Receiver 33 is a standard type receiver and its structure is well known to those skilled in the art. Receiver 33 may include a demodulator for demodulating an information transmission, and a data decoder/detector 37 for detecting information and data on the received information transmission. Data decoder/detector may be a digital detector for detecting digital data and information. AARTS processor 28 may control decoder/detector 37 to detect specific data and information.

Transmitter 32 is a standard transmitter and includes a data encoder 34 for encoding data and information received from AARTS processor 28. Transmitter 32 also includes modulator 36 for modulating the encoded data prior to transmission. Transmitter 32 may comprise a number of different types of transmitters, and the various components and operation of transmitter 32 are well known to those skilled in the art. Transmitter 32 receives information, data, codes and instructions from AARTS processor 28, and, under control of AARTS processor 28, transmits this information, data codes, etc. to ATC facility 48, or others, including other aircraft, via data link. Transmitter 32 preferably transmits information and data to a communications satellite (uplink). The information is then relayed from the communications satellite to the ATC facility 48 (downlink), or another receiver. The use of satellites to transmit the information from the aircraft to the ATC facility 48 has the advantage of having total coverage at all altitudes, and all locations, and avoiding the problems associated with VHF/UHF radio, such as line of sight problems, very limited range, and congestion on each frequency due to a high number of transmitting RF signals. However, a number of other communication or transmission techniques may be used, such as very high frequency radio (VHF), ultra-high frequency radio (UHF), optical communications, cellular telephone, etc., or a combination of these techniques. The term "data link" herein indicates one or more of the many available communications techniques (satellite, HF, UHF, or VHF radio, optical, cellular, etc.) Data encoder 34 uses well known techniques to encode data and information received from AARTS processor 28 into a digital format (i.e., data is converted to a series of bits). One such encoding technique is pulse code modulation (PCM), however, others may be used. Alternatively, analog encoding techniques may be used (amplitude, frequency or phase modulation), or a combination of digital and analog techniques. Modulator 36 then modulates the encoded data onto a carrier wave prior to transmission. In addition, transmitter 32 may include a dedicated processor (not shown) for interpreting instructions and information and controlling operation of transmitter 32.

Preferably, these transmitter control functions are performed by AARTS processor 28.

Referring to FIG. 2, the ATC facility 48 is illustrated and may be located on the grounds of an airport, or at a remote location, and may keep track of aircraft including their location, heading, speed, status, etc. The ATC facility 48 may also be located in the air or space, such as a satellite based ATC facility or an aircraft based ATC facility. Alternatively, a portion or all of the apparatus of ATC facility 48 may be located in the air or in space, such as on a satellite or aircraft, with information gathered by one or more such airborne ATC facilities transmitted down to a ground based master ATC facility for nationwide coordination.

ATC facility 48 includes a conventional two way radio 52 for communicating with aircraft. A pseudo-satellite 54 is provided to enhance accuracy of the GPS data, and is discussed in greater detail hereinbelow. An ATC facility receiver 60 receives signals transmitted via satellite communications on a satellite dish 56, and/or may receive signals transmitted via VHF or UHF radio on antenna 58, or may receive signals transmitted using other well known communication techniques, such as cellular telephone, optical communications link, etc. ATC facility receiver 60 includes a demodulator for demodulating the received signal. Receiver 60 also includes a data decoder/detector 64 for decoding or detecting the data or information received in the information transmission. Data decoder/detector 64 may be a digital detector for detecting digital data in information transmissions. ATC computer 66 may control decoder/detector 64 to detect specific data or information. The received and detected data or information is input to ATC computer 66, where the data and information are identified. ATC facility transmitter 61 similarly includes a data encoder 63 and modulator 65, and transmits data and information via satellite or using other communications technique.

An ATC computer 66 receives information and data from ATC receiver 60, and outputs data and information to ATC transmitter 61. ATC computer 66 includes one or more processors (not shown) and a computer memory (not shown) for storing information and data received and other information. ATC computer 66 controls the overall function and operation of the ATC facility 48. GPS receiver 67 (or multiple GPS receivers) provide GPS data of the ATC facility 48 to ATC computer 66. ATC video processor 68 generates the symbols or graphics to allow the display of aircraft, aircraft location, altitude, speed, status, etc. based on information received from the ATC computer 66 and information received via data link. ATC display 70 selectively displays certain aircraft and selected information about each aircraft under control of video processor 68 and/or ATC computer 66.

In operation, ATC computer 66 stores data and information about the different aircraft, such as aircraft identification codes (i.e., B727), registration or "N" numbers, flight plan identification codes (I or V), airline flight numbers (i.e. AA 235), aircraft flight plans for the different aircraft, characteristics about each aircraft (max. airspeed, altitude, turning characteristics, etc.). The aircraft flight plan may additionally include the route of the aircraft's flight, aircraft type, equipment code, true airspeed, departure airport, proposed departure time (Zulu), required flight level/altitude, destination airport, estimated time enroute, fuel on board (hours, minutes), pilot in command, number of passengers on board, color of aircraft, and remarks.

In addition, ATC computer 66 preferably stores and performs traffic separation alert functions. ATC computer 66 is programmed with the minimum horizontal and vertical separation requirements between aircraft ("traffic separation standards"). For example, current basic standards are typically a horizontal separation of 3 miles if the aircraft is within 40 miles of the radar antenna, and 5 miles if beyond. Typical vertical separation standards include 1,000 feet for altitudes up to 18,000 feet, 2,000 feet for altitudes of 18,000–29,000 feet, and 4000 feet for altitudes above 29,000 feet. The present invention may allow a decrease in such required separation due to improved accuracy of aircraft tracking over radar.

In accordance with the traffic separation alert functions, ATC computer 66 tracks each aircraft, monitors the location, tracking, speed altitude, status, and the relative location, altitude and tracking of each aircraft with respect to other aircraft. Based on GPS data for each aircraft, the received flight plan for each aircraft, and information on each type of aircraft regarding the aircraft's maximum and average speed, altitude, and flight characteristics, ATC computer 66 models the projected path and predicts possible (and even probable) separation standards violations, in addition to identifying existing separation standards violations. ATC computer 66 monitors the distance separating aircraft, identifies any possible conflicts or separation standards violations, and alerts or notifies the air traffic controller of these possible violations or conflicts so flights may be redirected.

ATC computer 66 may alternatively automatically redirect an aircraft's course, heading, altitude, etc., by the computer 66 determining the appropriate new course and transmitting via data link (i.e., transmitter 61) information to the aircraft informing it of the mandatory (or, alternatively, suggested) new route, altitude, heading, etc. Computer 66 may calculate an aircraft's new course, altitude speed, etc. based upon predicted routes of aircraft, aircraft location, altitude, tracking and speed, destinations of the aircraft, preferred routes of the aircraft, the shortest distance between each aircraft and its destination, each aircraft's flight plan, flight characteristics of each aircraft (maximum speed, altitude,....), aircraft status, separation standards, etc.

ATC computer 66 has preprogrammed flight plans for all aircraft. If ATC computer instructs an aircraft to change routes, directions, altitude, speed, etc. (whether temporarily to avoid another plane or permanently), the ATC computer 66 must update its stored flight plan in real-time to maintain accurate information on each aircraft. ATC computer 66 may instruct an aircraft to temporarily change direction or altitude to avoid another aircraft because, for example, computer 66 has estimated, based on the present flight paths of two aircraft and based on other information that there is likely to be a separation standards violation. Accordingly, ATC computer 66 may provide additional instructions to the aircraft to alter its course and altitude, etc. to place the aircraft back on its original flight path, altitude, speed, etc. ATC computer 66 may constantly update the stored flight paths and other information on aircraft to allow ATC computer 66 to accurately track, guide and control all aircraft.

Computer 66 may calculate the aircraft's new course, heading, speed, altitude, etc. based upon various information (such as listed hereinabove) and using well known mathematical approximations, calculations or techniques. For example, the calculation of the new aircraft heading, altitude, speed etc. may be performed by redirecting the aircraft to a heading that removes the aircraft from the predicted path of the conflicting aircraft by a predetermined distance or time. Or, the new heading may require the aircraft to make a 20 degree (for example) adjustment in heading so as to avoid the predicted path of the conflicting aircraft. Or, the aircraft heading and altitude may both be adjusted so as not to come within, say, 2 miles of the predicted path of the conflicting aircraft, or not to come within 2 miles of the conflicting aircraft itself based on the predicted path of the aircraft and of the conflicting aircraft.

The air traffic controller may be notified of the computer calculated new route or heading, altitude, speed, etc., for an aircraft and asked to acknowledge that such new course is acceptable prior to transmission from the ATC facility 48 to the aircraft. Alternatively, the air traffic controller may simply be notified of the aircraft's new course after it has been communicated to the aircraft. ATC computer 66 may communicate via transmitter 61 information such as the aircraft's location, altitude, heading or tracking, speed, aircraft status, closest aircraft, to the aircraft to allow the aircraft to verify that the ATC facility 48 has correct information. Also, ATC computer 66 may also transmit such information to other aircraft in the area to allow such aircraft to be aware of other aircraft that are nearby. To direct the information transmission from the ATC facility 48 to the correct aircraft, each information transmission may include a header segment that identifies the aircraft (by registration number, flight number, etc.), and an information segment that includes information, messages, or instructions. The transmissions from the aircraft should also follow this same format. The information transmitted between the ATC facility 48 and aircraft, and between aircraft, may include a wide variety of types of data and information, such as aircraft location, speed, altitude, tracking, aircraft status, inquiries to the aircraft pilot, responses to inquiries, instructions or commands to the aircraft from the ATC facility 48, information regarding the aircraft that are nearby, and other types of information discussed herein. This information is received by an aircraft and may be displayed on the aircraft's display 39 (FIG. 1) as text, graphic symbols, or other indicia. Alternatively the information may be in the form of synthesized voice or digitized speech generated at ATC facility 48, communicated to the aircraft via data link, and output to the pilot headset or a speaker. The information may be transmitted from the ATC facility in coded form and output as synthesized voice or speech on the aircraft. The pilot may respond to such inquiries or input new information to be transmitted to the ATC facility 48 or another aircraft via data input device 38 or by speaking into a microphone. Well known speech recognition equipment and software may interpret voice signals at both the ATC facility 48 and the aircraft and convert such voice signals into text or information prior to transmission.

ATC video processor 68 generates the graphics and text to illustrate the location of each aircraft on ATC display 70. ATC display 70 displays to the air traffic controller a pictorial or graphic representation of specified aircraft, their locations, status, headings, and other information in text or graphics based on information on the aircraft stored at and received by the ATC computer 66. Alternatively, the function of ATC video processor 68 may be performed by computer 66. Each air traffic controller should have his/her own display 70. Each ATC display 70 may have a separate video processor 68. ATC computer 66 may include a single computer, or may comprise a plurality of computers, where incoming information transmission and data therein are identified and forwarded to the appropriate computer. Aircraft display 39 (FIG. 1) may also include a video processor and a display for generating and displaying similar types of information to the pilot.

ATC computer 66 processes the incoming data for display. Computer 66 preferably identifies each received data. Each data may include, for example, an aircraft registration number, GPS position, GPS altitude, GPS speed, aircraft status information, messages of communications to and from aircraft, etc. There are a plurality of data in an information transmission, each information transmission including a header segment and an information segment. After detecting and/or identifying the data in the information transmission, ATC computer 66 processes the data. Such processing may include a number of different tasks, such as notifying the air traffic controller of the received data (by audible or visual display or annunciator) and identifying the associated aircraft, and making information about each aircraft available to the air traffic controller. ATC computer 66 selects and displays targets (aircraft) on a controller's display 70 based on the controller's assigned sector and altitude (i.e., north sector, 10,000–23,000 ft. alt.). Inhibit functions may be programmed into computer 66 such that the aircraft are displayed on the (each) display 70 for the appropriate controller. Some overlap may occur to ensure proper tracking of aircraft passing from one sector to another. The ATC computer 66 models the path of all detected incoming aircraft and displays (via display 70) these aircraft along with selected information on each aircraft. ATC computer 66 also displays any untagged aircraft (aircraft that transmit only "1200" (VFR) on a transponder code, and/or transmit no identification code via other communications or data link).

Display 70 may be a conventional radar scope, a dedicated CRT display, or other display. Selected information on each aircraft on the radar screen are displayed in the flight data box 71. Information displayed in the flight data box 71 may include:

1) Aircraft Identification (i.e., UAL195 or 5043J(V));
2) Aircraft Type (i.e., B757, C150);
3) Aircraft Operation (VFR [V] or IFR [I]);
4) Aircraft Heading (Tracking): (i.e., arrow pointing in the direction of travel);
5) Aircraft Speed in Knots (i.e., number above the arrow [300 knots]);
6) Aircraft Altitude (reference to sea level; reference to pressure; altitude above 18,000 ft.) (i.e., 50=5000 ft., 180=18,000 ft.);
7) Aircraft Location
8) Destination of Aircraft;
9) Notification of when an aircraft is transmitting - T, (T) or (circle T);
10) Whether the aircraft is planning to land at this airport, and if so, a designation of the runway to be used, and an indication when the runway is clear for landing;
11) Aircraft Status and other: Low fuel, emergency condition, aircraft equipment malfunction, aircraft electronics failure or malfunction, power failure, landing gear down, notification that aircraft is off flight plan, notification that two aircraft are too close (possible violation of separation standards), indication of evasive maneuvers being conducted by an aircraft in response to anti-collision equipment (i.e., a blinking arrow up or down), receipt of aircraft's request to close flight plan, receipt of information typed in by pilot into data input device, notification that two aircraft are likely to come too close (separation standards violations) based on projected paths or flight plans.

While all this information may be displayed in each flight box 71 on display 70, it is advantageous to display only selected information (such as the information shown displayed in FIG. 2) in each flight box 71, while allowing the air traffic controller to "click" or select on an aircraft using a mouse, trackball or other pointing device to cause the remaining information on the selected aircraft to be displayed in text or graphical form on another screen, window, or another display. For example, information such as the aircraft's heading, identification or flight number, aircraft type, altitude and/or location, and an indication that the aircraft's radio is transmitting (T) may be displayed in flight box 71, with the remaining information on the selected aircraft available on the second screen or display. By displaying only selected information on display 70, the air traffic controller is allowed to quickly view many different aircraft on display 70 while still having access to more detailed or additional information by selecting an aircraft using a pointing device.

Referring to FIGS. 1–2, the satellite based ATC system illustrated in FIGS. 1–2 provides an air traffic control system that may effectively replace radar or at least supplement radar. The ATC system of FIGS. 1–2 allows air traffic controllers to track and control aircraft even in areas outside the range of conventional radar. The system of FIGS. 1–2 also provides improved accuracy over radar, and provides improved communication between aircraft and air traffic controllers as compared to conventional radio communications.

Prior to a flight, the pilot registers the aircraft and its flight plan with the ATC facility 48. Computer 66 stores information on the identification of the aircraft, the aircraft flight plan, and other information. Prior to take-off, the flight plan and other information for each aircraft may be transmitted via data link (satellite, VHF/UHF, cellular telephone, etc.) from the ATC facility 48 to the aircraft unit 18. AARTS processor 28 receives the information and downloads (stores) this received information in memory 30. Also, various communications may occur between aircraft and the ATC facility 48 prior to aircraft take-off, such as to confirm the flight plan, etc. The flight data box 71 of display 70 displays a variety of information to the air traffic controller regarding each aircraft in his/her assigned sector and altitude range. As discussed above, the information displayed to the controller on the display 70 may include aircraft identification, speed, heading, altitude, and notification as to the status of the aircraft. The GPS data is input into AARTS processor 28 from comparator 24 and is continuously updated.

While in flight, the aircraft may communicate with ATC facility 48 via two-way radio 44. In addition to using two-way radios, the aircraft and the ATC facility 48 may communicate with each other over an additional communications link (i.e., a data link) using transmitter 61 and receiver 60 of the ATC facility and transmitter 32 and receiver 33 of the aircraft. In particular, AARTS processor 28 periodically communicates via transmitter 32 and receiver 60 over a data link (preferably satellite communications) to transmit the GPS data of the aircraft, aircraft identification, status of the aircraft, and other information to the ATC facility 48. Upon receipt of the transmitted data at ATC facility 48, computer 66 processes the data and then displays the data on the display 70. The data displayed on display 70 allows the air traffic controller to keep track of and control aircraft in his/her assigned sector and altitude range.

When a pilot on an aircraft transmits information using his two-way radio 44, transmit detector 46 detects the transmission of information from radio 44. AARTS processor 28 is informed of the transmission from radio 44 and controls transmitter 32 to transmit additional data notifying the ATC facility 48 that the aircraft is transmitting over its two-way radio. AARTS processor 28 preferably generates a code (a radio transmit detect code) that indicates a radio transmission from aircraft radio 44. This transmit detect code is preferably a T or (T), although a wide variety of symbols could be used. The transmit detect code, or information representing this transmit code, is then encoded as a series of bits, modulated and transmitted to ATC facility 48. The receiver 60 of ATC facility 48 receives, demodulates, and decodes this transmit detect code. ATC computer 66 recognizes this transmit detect code and instructs symbol generator to generate the (T) symbol and output this (T) symbol to display 70 adjacent the other information in the flight box 71 for this aircraft. The aircraft identification information (transmitted with the transmit detect code) identifies the specific aircraft to which the (T) symbol corresponds. The (T) symbol indicates that the identified aircraft is presently transmitting via two-way radio. This (T) symbol makes it very easy for the controller to determine what aircraft with which he is communicating via 2-way radio, and allows the controller to more easily confirm that the correct aircraft is responding to his/her instructions.

When the transmission from radio 44 is complete, transmit detector 46 detects that radio 44 is no longer transmitting, and notifies AARTS processor 28 that the transmission has terminated. AARTS processor 28 then instructs transmitter 32 to cease transmitting the transmit detect code (T). ATC computer 66 then fails to receive the (T) code from receiver 60 and in response, instructs symbol generator 68 to cease generating the (T) code for display. The result is that only when the pilot is speaking on his two-way radio 44, a (T) symbol is displayed on the controller's display 70.

Surface Movement and Detection System For Aircraft

During low visibility conditions or under any conditions, it is advantageous for controllers at the ATC facility 48 to know the exact location and status of all aircraft on the ground at an airport. In addition to an air traffic control system, the system of FIGS. 1–2 may also be used to provide a non-radar surface movement and detection system for aircraft located on the ground.

For aircraft located on the ground at the airport, including aircraft in storage or in hangars, aircraft loading passengers, aircraft preparing to take-off, aircraft that have just landed, etc., each aircraft should preferably include on board thereon an aircraft unit 18. The ATC facility 48 and aircraft units 18 on board each aircraft located on the ground of the airport allows the ATC facility 48 to track the location and status of each aircraft on the ground, and allows for the communication of data and other information (in addition to verbal communications over two-way radio) between the aircraft and the ATC facility 48 via data link. While use of a communications satellite as a data link is advantageous during flight, the communications satellite may also be used as the data link while aircraft are on the ground. Alternatively, other communication techniques may be used for aircraft on the ground, such as cellular telephone, HF/VHF/UHF radio, etc., to communicate data and information between aircraft and ATC facility 48.

ATC facility 48 tracks aircraft on the ground in the same manner that aircraft are tracked while in flight. As discussed above, each aircraft, its registration number or flight number, and other information is registered with the ATC facility 48. Aircraft, while on the ground (or in the air) may periodically transmit an information transmission comprising coded signals or data. As with other information transmissions from aircraft during flight to the ATC facility 48, the information transmission transmitted while on the ground may comprise a header segment and an information segment. The header segment includes aircraft identification information (i.e., registration number, flight number), while the information segment may include other information such as GPS data (position, altitude, track, speed), aircraft status information, and other information.

The ATC facility 48 receives the information transmission from each aircraft, and ATC computer 66 identifies each aircraft, and displays the aircraft or a symbol representing the aircraft, its location on a display at the ATC facility 48. ATC computer 66 identifies the aircraft using the received identification information. Because each aircraft transmits its location and a different predetermined identification code (known by ATC computer 66), each aircraft is effectively "tagged," allowing the identity and location of each aircraft to be ascertained by computer 66. The surface movement and detection system also includes a mapping system (i.e., software) resident in ATC computer 66 that maps the different airport structures, including airport ramps, taxi ways, runways, hangars, buildings, etc., and is programmed with the GPS coordinates of the location of each of these airport structures, so the relative location of each aircraft on the ground may be determined by ATC computer 66. ATC computer 66 may display all structures on the airport (runways, taxi ways, buildings, etc.), or just selected ones at the request of the air traffic controller. The surface movement and detection system may use the same display (70) as used for the tracking of aircraft while in the air, or may use a separate display. ATC computer 66 keeps track of all aircraft on the ground, including their locations and status.

Tracking and coordination of aircraft on the ground is enhanced by each aircraft transmitting a transmit detect code to the ATC facility 48 when the pilot on the aircraft is communicating (transmitting) using his two-way radio 44, as discussed hereinabove. The transmit detect code is accompanied by the aircraft's identification information. This information is received by the ATC facility, and a predetermined symbol, such as a T or a (T) is displayed at display 70 (or other display) to indicate reception of the transmit detect code. The display of the predetermined symbol (T) indicates to the air traffic controller that the pilot is transmitting on his two-way radio 44. This transmit detect code and aircraft identification information allows the controller to determine which aircraft on his display he is communicating with over his two-way radio. This information also allows the controller to verify that when he communicates an instruction to a designated aircraft (i.e., you are clear to take off), only that designated aircraft responds to that instruction.

Through the automatic communication of information and data via data link between aircraft and the ATC facility 48 (and even other airports), and real-time processing of the received information and data by ATC computer 66, ATC computer 66 keeps track of (and may control) the aircraft flying in the area, aircraft on the ground and their locations, the anticipated landings and take-offs for aircraft, the scheduled runways to be used, and the timing/scheduling of all events. The air traffic controller located at the ATC facility 48 would typically use ATC computer 66 to coordinate the movement of aircraft.

Alternatively, ATC computer 66 may automatically coordinate and control the occurrence of all events at the airport, and communicate with aircraft on the ground and in the air to ensure that all aircraft movement on the ground and in the air, including landings, take-offs, etc. occurs in an orderly and efficient manner while maintaining a safe predetermined distance or time separating each aircraft/event, so as to avoid separation standards violations and collisions. ATC computer 66 is programmed to receive aircraft location, status and other information from aircraft, aircraft flight plans, requests from aircraft (to land, take-off, emergency condition, etc.), and to provide the appropriate responses, information and instructions to each aircraft in order to coordinate and control the movement of aircraft in the air and on the ground. In this manner, the systems of the invention provide an intelligent and automated airport.

The accuracy of aircraft positioning used by the ATC facility 48 for the surface movement and detection system (determination of the locations of aircraft located on the ground) may be improved through the use of: 1) differential navigation and/or 2) pseudo-satellites. GPS receivers 20, 22 and 67 may operate in either absolute navigation mode, or differential navigation mode. In the absolute navigation mode, the GPS receivers determine their position absolutely with respect to a specific set of map coordinates, such as longitude and latitude. Although GPS receivers are one of the most accurate ways to determine location, heading, etc., a number of errors are inherently introduced that affect GPS accuracy, such as, satellite ephemeris and clock bias error, ionospheric and tropospheric delays, and line of sight ranging errors. As a result, a GPS receiver operating in absolute navigation mode may include average errors of over 100 feet.

In differential navigation, two GPS receivers continuously exchange navigation information with one another in real time. One of the GPS receivers (67) acts as a base station; The other GPS receiver (20 or 22) navigates relative to the base station's location. The base station (ATC facility 48) determines its real-time pseudo-range solution based upon the received binary pulse trains (pseudo-range=C×delta T). Because the base station also knows its exact location, it also determines a real-time geometrical solution (geometrical range=satellite position−base station position). The base station then calculates a pseudo-range correction by subtracting the geometrical range from the pseudo-range. This pseudo-range correction is periodically calculated and transmitted to all GPS receivers (20 and 22). GPS receivers located on aircraft (on ground and in air) may subtract this correction from their calculated pseudo-ranges to obtain GPS position, altitude, speed, and track that are much more accurate. The GPS resident processor of GPS receivers 20 and 22, and/or AARTS processor 28, and ATC computer 66 are programmed with software, using well known techniques, for performing the appropriate calculations and communications of pseudo-range corrections and other data. While the pseudo-range errors may be transmitted from the base station (ATC facility 48) to all aircraft, it is preferable that ATC computer 66 receives the uncorrected GPS data from each aircraft, and then performs this subtraction or adjustment of the received aircraft GPS data using the pseudo-range correction prior to displaying aircraft and their position on the ATC display at the ATC facility 48. Thus, using differential navigation, the GPS position calculated by each aircraft is transmitted to the ATC facility 48, and the ATC computer 66 subtracts the pseudo-range correction to obtain the corrected position of each aircraft.

An improvement in the accuracy of aircraft positioning at ATC facility 48 using differential navigation is possible due to substantially common errors between the ATC GPS receiver 67 and aircraft GPS receivers 20 and 22. Satellite and ephemeris and clock bias error tend to be common to GPS receivers, and commonality also exists between the ionospheric and tropospheric delays, which are introduced as the L-band signals (binary pulse trains) travel toward the ground. Any remaining line of sight ranging errors tend to be minimal. Therefore, the use of differential navigation may be advantageously used to remove many errors and improve the accuracy of GPS receivers. The use of differential navigation is particularly effective on a surface movement and detection system where the aircraft are positioned on the ground relatively near to the base station (ATC facility 48). However, differential navigation may also be used for an ATC system for the tracking of aircraft in flight. In an ATC system, the ATC facility 48 may be used as the base station, or other base stations may be located at various positions on the ground throughout the U.S. and the world. These base stations may be interconnected via data link (optical fiber cable, VHF/UHF, satellite, etc.) to provide a network of base stations. In addition, satellites, whose positions are known, may be used as base stations.

The second way aircraft positioning (accuracy of position) may be improved is through the use of so-called pseudo-satellites. Pseudo-satellites are "false" satellites that are usually located on the ground at fixed locations and transmit navigation signals similar to the ones transmitted by the GPS satellites. The GPS receivers must include software to receive and process and lock onto these signals transmitted by pseudo-satellites. While the use of a ground based pseudo-satellite may be limited by line of sight problems, the pseudo-satellite provides an additional source of GPS type positioning signals. To avoid jamming the reception of signals of real GPS satellites, it is desirable for pseudo-satellites to transmit their positioning signals only part of the time, such as by using a time-division multiple access technique. Pseudo-satellites may also transmit differential corrections. The use of pseudo-satellites may improve the accuracy of the positioning of aircraft in a surface movement and detection system.

Aircraft, while on the ground, may communicate with ATC facility 48 via data link to transmit and receive a variety of different types of information. For example, aircraft instrumentation, switches and electronics may be connected to AARTS processor 28. During pre-flight testing, information may be transmitted from the aircraft unit 18 to ATC facility 48 to inform ATC facility 48 that the aircraft has passed its pre-flight test, or to inform ATC facility 48 of those systems that malfunctioned or failed pre-flight test, to allow repairs to be performed immediately.

Also, information regarding other status of the aircraft may be communicated to ATC facility 48 prior to take-off. The flight plan or other information may be communicated from the ATC facility 48 to the aircraft unit 18 and stored in memory 30 of aircraft unit 18. Aircraft unit 18 may communicate via data link to ATC facility 48 to verify or confirm specific information, such as the flight plan, flight instructions, departure runway, etc. Display 39 may display, in graphical, text or other form, the planned flight plan, or the planned and approved/proposed flight route and other information for review and confirmation by the pilot. The pilot or crew may input information into AARTS processor 28 using data input device 38, which may include a keyboard, keypad, a series of buttons or switches, a microphone, etc. This information input by the pilot may be communicated to ATC facility 48 via data link (satellite, cellular, VHF/UHF, etc.), either automatically after being input, in response to actuation of a switch, or in response to another event. The ATC facility 48 may transmit questions or responses which are displayed to the pilot on display 39 in the form of text or graphic symbols. The aircraft unit 18 may also transmit questions and responses to ATC facility for display.

Prior to take-off, aircraft unit 18 may transmit information via data link to the ATC facility that it is ready for take-off, and the ATC facility may respond with appropriate instructions (i.e., that the aircraft is clear to take off and designation of the runway to be used). While such communication normally occurs verbally between aircraft and the air traffic controller using two-way radios 44 and 52, the invention allows such verbal communications process to be replaced or at least supplemented by the transmission of coded signals and/or data that are transmitted via data link (satellite, HF, VHF, UHF, cellular, etc.) and displayed to improve the communications process and the accuracy of information communicated. Aircraft that have just landed may receive via data link instructions of where to taxi, and whether the terminal is accessible, or open, etc. After landing, the aircraft unit 18 may communicate a request via data link to close the aircraft's flight plan to ATC facility 48. The request may be made manually by the pilot actuating a switch or by inputting a predetermined instruction or code using input device 38, or the request may be generated automatically in response to the landing of the aircraft, the lowering of the landing gear, in response to interrogation from the ATC facility 48, or in response to some other event.

The Flight Control System

FIG. 2 illustrates a flight control system 72 located on an aircraft for automatically controlling the flight of the aircraft. A flight control computer 74 controls all operations and functions of the flight control system 72. Flight control computer 74 receives GPS data from GPS receivers 20 and 22 through GPS data comparator 24. The flight control computer interfaces to a number of aircraft systems 78, such as electrical power, fight management system, inertial reference system (IRS), air data system, radio altimeter, instrument landing system (ILS), central warning system, etc. An input device 76 may be used to input data and information into computer 74, and a screen or display may display information and data. The display may provide annunciators for indicating to the pilots the activation/selection of the various flight modes and systems (autopilot, heading select, VOR, etc.). A flight control panel 80 provides the primary interface between the fight crew and the other components of the flight control system. The control panel 80 includes a number of pushbuttons that provide momentary discrete inputs to the flight control system. The pushbuttons provide four categories of control: 1) combined control (autoland, ILS, Turb, VNAV), 2) pitch control (vert. speed, altitude hold), 3) Roll control (VOR Location, Heading hold, heading select, Nay), and 4) Autothrottle control (speed select, mach select). The panel also includes an autopilot engage switch for engaging the autopilot, and a switch for selecting autoland. Next to the autoland switch is a switch for selecting the autoland to be performed based on ILS or based upon GPS data. A number of control knobs and displays are also on the control panel 80, including altimeter knob (for dialing in a desired altitude), heading knob (for dialing in a desired heading, etc. A number of digital display readouts are also provided on the control panel 80, including displays for: airspeed (knots), heading (magnetic heading displayed in degrees), altitude, pitch (vertical airspeed, mach value, pitch attitude).

Flight control computer 74 also connects to the various aircraft sensors 84 (i.e., aileron position sensor, rudder position sensor, flap position sensors, spoiler position sensors) and navigational aids (IRS, VOR/DME, Tacan, etc.) Computer 74 also connects to standard or conventional aircraft instrumentation 82 (gyroscopes (IRS), pressure instruments, altimeter, vertical speed indicator, airspeed indicator, magnetic compass, engine and power instruments, ammeter, etc.), as well as to aircraft and autopilot servos 88 for actuating different aircraft systems or units, such as the servos for actuating and controlling the aircraft aileron, rudder, engine, flaps, spoiler, etc. Warning indicators 90 provide warnings of various conditions to the crew. Flight control computer 74 also connects and communicates with AARTS processor 28 and STARS processor 29 for coordinating the operation of all systems. AARTS processor 28, STARS processor 29 and flight control computer 74 may be a single computer or microprocessor.

Flight control system 72 may be operated in manual mode or autopilot mode. In manual mode, the pilot is in control of the flight of the aircraft, including its heading, speed, altitude, etc. The pilot may dial in a desired speed, altitude, or air speed, etc. to partially automate flying the aircraft. In the manual mode, computer 74 may use information from GPS receivers 20, 22 as well as from a number of external navigation aids and other equipment, such as sensors and instruments.

In autopilot mode, the aircraft is controlled by computer 74 to fly a predetermined flight path. When flight control system is operated in the autopilot mode (i.e., by switching the autopilot switch on panel 80), the pilot causes the autopilot to control the aircraft based on information input to computer 74. In autopilot mode, flight control computer automatically provides control of the roll, pitch, yaw, and operationally controls the aircraft attitude, heading, altitude, airspeed, etc. In autopilot mode, computer 74 also provides automatic throttle control (control of speed, mach and thrust), detects engine failures, monitors engine parameters, monitors fuel level, monitors the operation of all systems (in autopilot or manual mode). Computer 74 may operate in autopilot mode during take off, flight, and landing. In autopilot mode, computer 74 provides command signals to the autopilot servo drives for servos 88 (which may include aileron, elevator and rudder, etc.). These command signals provide proper movement of the aileron, elevator and rudder. Computer 74 also controls the thrust and speed by controlling the engine throttle, and controls operation of a number of other aircraft systems.

In autopilot mode, the computer 74 controls the servo drives, throttle and other systems to control the flight of the aircraft on a predetermined flight path that is input in computer 74 or previously stored in computer 74. The predetermined flight path may include headings, altitudes, speed, destinations., locations and other information. This predetermined path may include instructions to navigate the aircraft based on signals received by computer 74 from GPS receiver(s), or based on a number of different external navigation aids, such as ILS, VOR/DME, IRS, or the like. The aircraft may periodically receive instructions or information to update or change its flight path from the pilot or crew, or from ATC facility 48. Computer 74 may even update or alter its flight path based on communications from other aircraft. For example, the aircraft may alter its flight path to avoid a collision with another aircraft based on information it receives from its anti-collision system, such as the STARS processor 29. Or, ATC facility 48 may communicate via data link to instruct the aircraft to alter its flight path to avoid a separation standards violation, or to accommodate hazardous weather conditions.

In autopilot mode, computer 74 may rely primarily on GPS receivers 20, 22 for the aircraft's position, altitude, speed, and tracking (heading). The input of a flight path may also include a selection as between reliance on GPS or other navigation aids. Use of one or more pseudo-satellites, and particularly the use of differential navigation may improve navigation of the aircraft in the manual or autopilot mode. While in autopilot, the aircraft may be placed in the autoland mode, which instructs the aircraft to automatically land itself.

During autoland mode, the aircraft's localizer and glideslope receivers may receive the localizer and glideslope signals emitted near the runway. The computer 74 may control the aircraft to land based upon the localizer and glideslope radio signals, which provide horizontal and vertical control to the computer 74 during the ILS precision landing.

Computer 74, however, preferably uses the differential GPS data, including pseudo-range corrections from facility 48, to land the aircraft. The computer 74 stores in memory, or receives via data link from ATC facility 48, information on the location of the airport, locations and dimensions of all structures at the airport, including runways, taxiways, buildings, terminals, and the direction from which the aircraft should approach each runway for landing. Based on this information describing the layout and structure of the airport, the computer 74 may display on a screen or display a picture or graphical image of the layout of the airport with designation as to the route or path to use for landing, the runway to use, the location of aircraft on the ground.

Computer 74 controls the aircraft to automatically land the aircraft based on the known positions of the airport and runways, the recommended path for landing, the recommended altitude, location and speed for all points along the aircraft's flight path during and before the landing. The computer 74 may store, or receive via data link from the ATC facility 48, such information on the recommended locations, speed, altitude for points along the flight path.

ATC facility 48 may also communicate to the aircraft via data link instructions on which runway to use, the aircraft that are on the ground and their locations, other approaching aircraft and their location, and instructions on what to do after landing (i.e., taxi to terminal 4d). Computer 66 automatically receives information (including aircraft GPS data, aircraft status information, etc.) in real-time describing the landing(s) in progress of the (and all) aircraft via communications from each aircraft. The ATC computer 66 also stores information on the layout, locations and structures of all runways, landing points, buildings, etc. Based on this airport map and the information received from each aircraft regarding its GPS data and status, the ATC facility monitors the aircraft's speed, positioning, altitude, etc., compares this received information to the ideal or suggested position, speed, heading, etc. of the ideal or suggested landing (stored in computer 66), and communicates via data link instructions or information to the aircraft flight control computer 74 to adjust its speed, altitude, positioning; etc. to improve the landing, or to avoid an aircraft on the ground, etc. Therefore, ATC facility 48 may communicate with aircraft during landings to monitor the landings and provide instructions to aircraft to assist the aircraft in the landings.

While the above ATC, surface movement and detection, and flight control systems of the invention have been described hereinabove to track, guide, control and communicate with aircraft in the air and on the ground, the same systems may be employed to track, guide, control and communicate with other vehicles such as ships, automobiles, railroads, submarines, etc.

Figure 3:
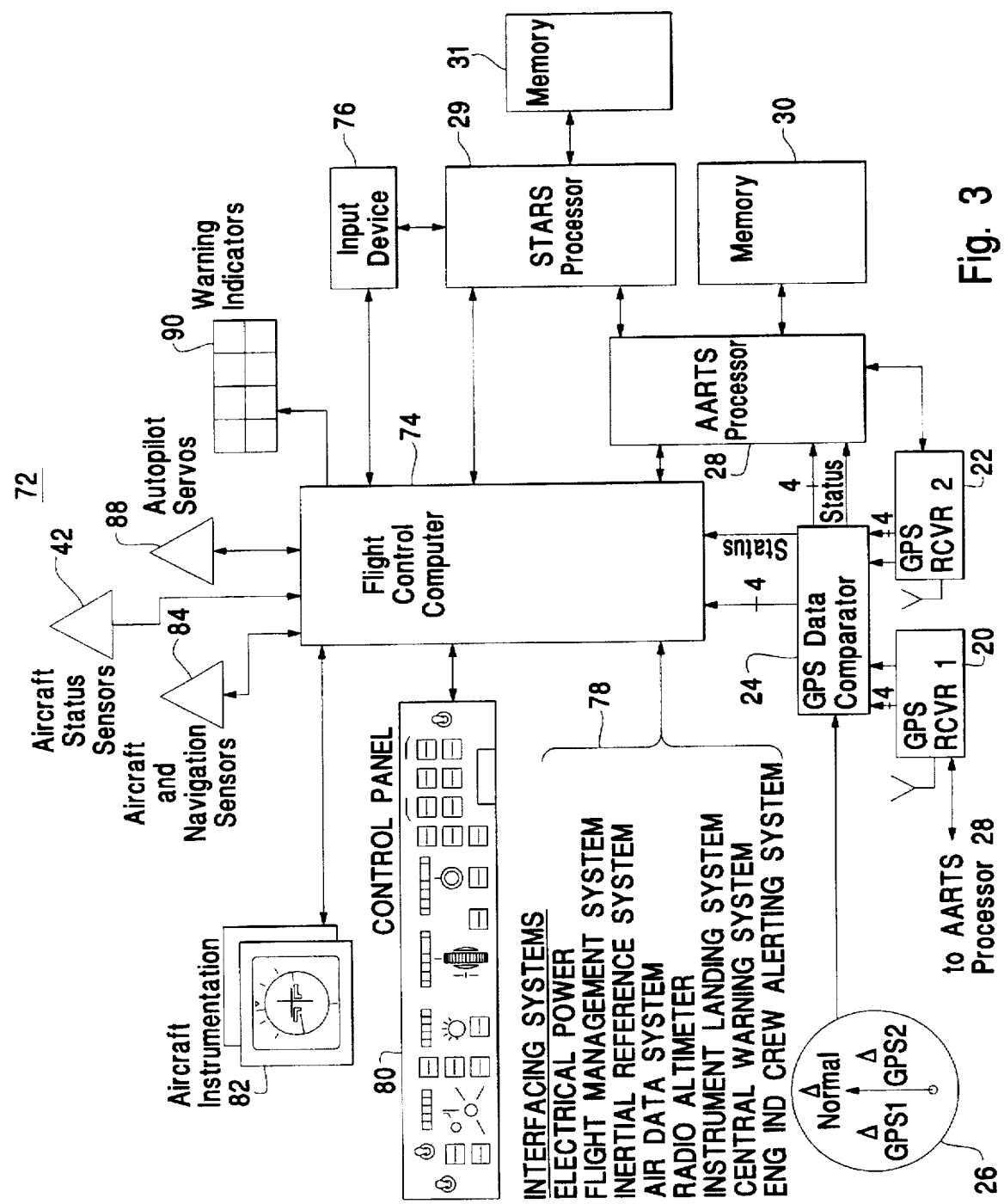
FIG. 3 is a block diagram of a flight control system constructed according to the principles of the invention.

When the systems of the invention are used on ships, each ship includes unit 18, illustrated in FIG. 1. A central facility 48, located at a harbor, dock, or a port, on a ship at sea, or other location, includes the system shown in FIG. 2. The ship systems (FIGS. 1–3) generally may operate like those described for aircraft, but are adapted for use with ships or sea vessels. Each ship obtains its position, track, speed from GPS receivers 20 and 22, and its status, and periodically communicates this information via data link (HF, VHF, UHF, satellite, etc.) to the central facility 48, along with ship identification data. The central facility (48) keeps track of the location of all ships at sea, for example, within a predetermined and limited region. The central facility 48 may also keep track of many other objects (including their locations), such as bridges, rocks, icebergs, docks, etc. Computer 66 of central facility 48 anticipates possible ship conflicts or collisions based on the paths of the ships and information received from the ships regarding their path and destination. Central facility 48 may provide instructions via data link to ships to alter their path, or to warn of dangerous objects or other ships in their path. Central facility 48 may communicate with ships entering a channel or port and provide instructions to guide the ship down the channel, river, etc. The ship's transmit detector 46 may detect the transmission from ship radio 44 and transmit this transmit detect signal (T) along with ship identification information to the central facility 48. Ships may provide the status of their ship (i.e., emergency, low fuel, send help) to the central facility, along with their GPS data. Each ship may also include a system similar to that illustrate in FIG. 3, but for the automatic control and guidance of ships.

What is claimed is:

1. A method of identifying the source of an information transmission using a second transmission, said method comprising the steps of:
    storing on a vehicle a vehicle identification code identifying the vehicle;
    transmitting information from a communications device on the vehicle;
    automatically detecting, on the vehicle, said step of transmitting the information;
    generating on the vehicle a transmit detect code in response to said step of detecting;
    transmitting said second transmission from the vehicle only while the communications device is transmitting the information, said second transmission comprising the vehicle identification code and the generated transmit detect code;
    receiving the information, the vehicle identification code and the transmit detect code transmitted from the vehicle; and
    identifying that said vehicle is the source of the transmitted information based on said received identification code and the received transmit detect code.

2. The method of claim 1, said method further comprising the step of displaying one or more visual symbols identifying the vehicle and indicating when the vehicle is transmitting the information based on said step of identifying.

3. The method claim 1 wherein said step of transmitting information comprises the step of transmitting audio signals from a two-way radio located on the vehicle.

4. The method of claim 1 wherein said step of detecting comprises at least one of the following steps:
    (a) detecting the actuation of a microphone or other audio input device;
    (b) detecting voice or audio signals; and
    (c) detecting when a radio is transmitting information.

5. The method of claim 1 wherein said step of automatically detecting comprises receiving an interrupt signal indicating the vehicle is transmitting the information.

6. The method of claim 1 wherein said step of generating a transmit detect code comprises the step of a code generator generating the transmit detect code in response to said step of automatically detecting.

7. The method of claim 1 wherein said step of generating a transmit detect code comprises the step of a processor generating the transmit detect code in response to said step of automatically detecting.

8. The method of claim 1 and further comprising the step of identifying when the vehicle is transmitting the information based on the presence or absence of a received transmit detect code in the second transmission.

9. The method of claim 1 and further comprising the step of detecting when the vehicle ceases transmitting the information based on the absence of a received transmit detect code subsequent to the presence of a transmit detect code for that vehicle.

10. The method of claim 9 wherein said step of transmitting from the vehicle comprises the step of transmitting the vehicle identification code and the generated transmit detect code, said transmit detect code being transmitted only during a period of time in which the vehicle is transmitting the information based on said steps of detecting.

11. The method of claim 10 further comprising the step of identifying the period of time during which the vehicle is transmitting the information based on said step of transmitting.

12. The method of claim 11, said method further comprising the step of displaying one or more visual symbols identifying the vehicle and indicating when the vehicle is transmitting the information based on said step of identifying the period of time.

13. A method of identifying an aircraft transmitting information using a second transmission, said method comprising the steps of:
    storing on the aircraft an aircraft identification code identifying the aircraft;
    transmitting information from a radio on the aircraft;
    automatically detecting, on the aircraft, said step of transmitting the information;
    automatically detecting, on the aircraft, when the aircraft radio ceases transmitting the information;
    generating on the aircraft a transmit detect code in response to said step of automatically detecting the transmission of the information;
    transmitting from the aircraft said second transmission, said second transmission comprising the aircraft identification code and the generated transmit detect code, the transmit detect code being transmitted, based on said steps of detecting, only while the aircraft radio is transmitting the information;
    receiving the information, the aircraft identification code and the transmit detect code transmitted from the aircraft;
    identifying that said aircraft is the source of the transmitted information based on said received aircraft identification code and the received transmit detect code;
    identifying when said aircraft is transmitting the information based on the presence or absence of said received transmit detect code; and displaying visual indicia or symbols on a display based on said steps of identifying, said visual indicia or symbols identifying the aircraft, identifying the aircraft as the source of the information transmission, and identifying when the aircraft is transmitting the information.

14. The method of claim 13, said method further comprising the step of determining on the aircraft the location of the aircraft.

15. The method of claim 14, said method further comprising the step of transmitting the location of the aircraft on said second transmission and based on said step of determining the location of the aircraft, said step of receiving further comprising the step of receiving the location of the aircraft on said second transmission.

16. The method of claim 15 wherein said step of displaying further comprises displaying a symbol or indicia on the display designating the location or having a location based on the received aircraft location.

17. The method of claim 13 wherein said step of transmitting information from a radio on the aircraft comprises the step of transmitting audio information from a pilot of the aircraft via a two-way radio.

18. The method of claim 17 wherein said step of displaying comprises the step of displaying a visual symbol or symbols on an air traffic control display.

19. The method of claim 15 wherein said step of determining on the aircraft the location of the aircraft is performed using an on-board Global Positioning Satellite receiver.

* * * * *